UNITED STATES PATENT OFFICE.

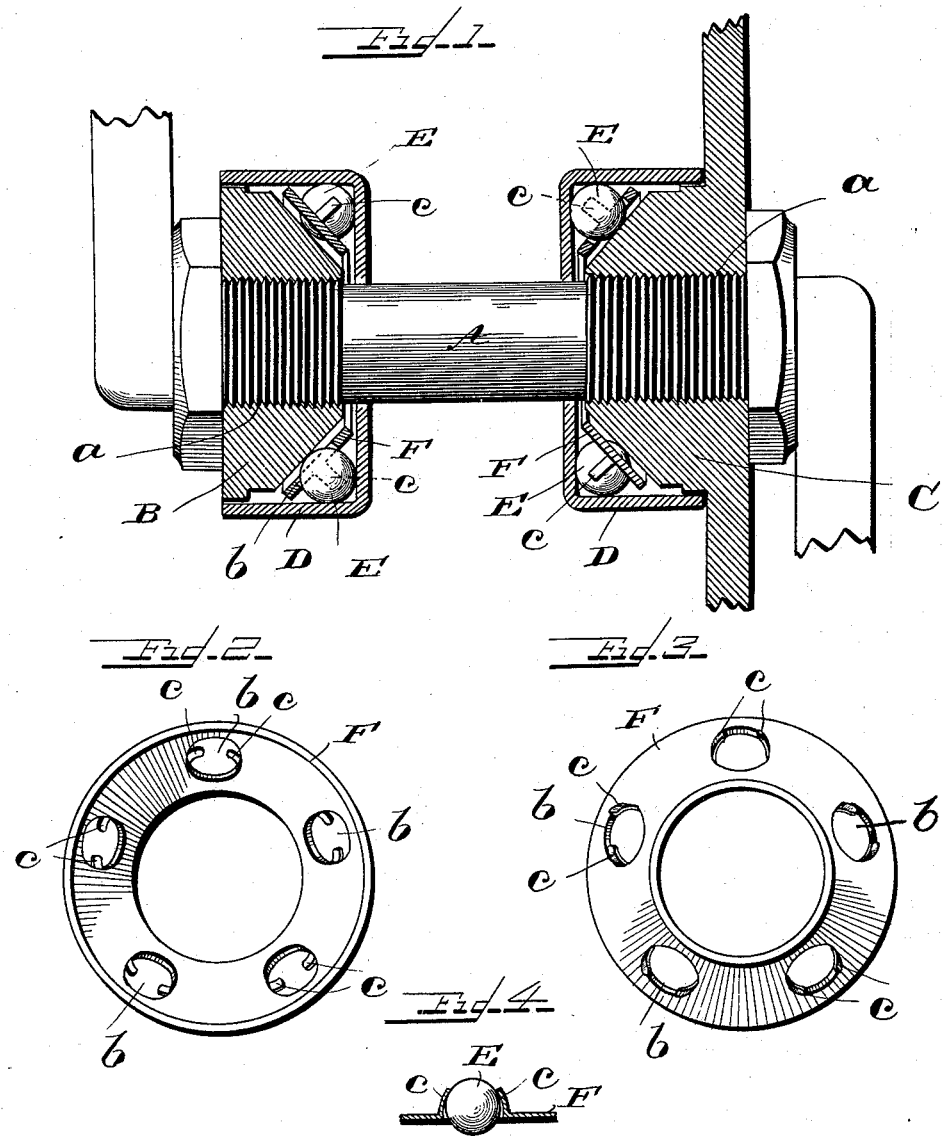

THOMAS MIDGLEY, OF COLUMBUS, OHIO, ASSIGNOR OF ONE-HALF TO THE COLUMBUS BICYCLE COMPANY, OF SAME PLACE.

BICYCLE-BEARING.

SPECIFICATION forming part of Letters Patent No. 596,524, dated January 4, 1898.

Application filed May 1, 1897. Serial No. 634,733. (No model.)

*To all whom it may concern:*

Be it known that I, THOMAS MIDGLEY, a citizen of the United States, residing at Columbus, in the county of Franklin and State of Ohio, have invented certain new and useful Improvements in Bicycle-Bearings; and I do hereby declare the following to be a full, clear, and exact description of the invention, such as will enable others skilled in the art to which it appertains to make and use the same.

My present invention relates to ball-bearings especially designed for use on bicycles, tricycles, and other like vehicles; and it consists in certain improvements in construction, which will be fully disclosed in the following specification and claims.

In the accompanying drawings, which form part of this specification, Figure 1 represents a vertical longitudinal section of a crank-axle, showing the application of my invention thereto; Fig. 2, a plan of the ball-retainer detached; Fig. 3, a like view of the opposite side of the same; and Fig. 4, a section through one side of the retainer, showing a ball in side elevation.

Reference being had to the drawings and the letters thereon, A indicates the crank-axle, which is provided with screw-threads $a\,a$, with which the internally-threaded cones B and C engage to compensate the wear of the ball-bearings, D D the cups of the bearings, which are mounted upon the axle, and E balls, all of which may be of any approved form of construction.

In this class of devices great annoyance is experienced, when the bearings are separated for the purpose of cleaning the several parts, by losing the balls, and to prevent their being lost I interpose an annular retainer F, which is conical in form, made of thin sheet metal, and provided with as many apertures $b$ as there are balls in the bearing and with prongs or arms $c\,c$, which are integral with the body of the retainer, stamped or cut out of the metal on opposite sides and bent inward toward each other to secure the ball in the pocket thus formed.

The prongs $c\,c$ are of such length that the major portion of the balls is on the side of the retainer from which the prongs project, the apertures $b$ being of a diameter a little less than the diameter of the balls E, and are thereby held in position by the wall of the aperture and the prongs on opposite sides of the balls. The balls E being thus secured in the retainer F, they may be readily removed and cleaned while held in the retainer and subsequently replaced without danger of being lost, and when replaced the balls are separated in the retainer and prevented coming in contact with each other.

While I have shown my invention applied to the crank-axle of a bicycle, it is obvious that it may be applied to the bearings in the hubs of the wheels of such and other vehicles.

Having thus fully described my invention, what I claim is—

1. A ball-retainer for journal-bearings, consisting of a sheet-metal conical annulus having apertures therein and provided with prongs or arms, and balls projecting through the apertures on both sides of the annulus and secured by said prongs.

2. A ball-retainer provided with apertures less in size than the diameter of the balls to be retained therein, balls projecting less than half through said apertures on one side and more than half on the opposite side of the retainer, and prongs engaging the balls opposite the smallest portions projecting through the apertures.

3. A ball-retainer, consisting of a conical annulus provided with apertures less in size than the diameter of the balls to be retained therein, balls projecting less than half through said apertures on one side and more than half on the opposite side of the retainer, and prongs engaging the balls opposite the smallest portions projecting through the apertures.

In testimony whereof I affix my signature in presence of two witnesses.

THOMAS MIDGLEY.

Witnesses:
H. W. WEBB,
JOHN K. YUNG.